United States Patent [19]
Artiglia et al.

[11] Patent Number: 5,754,334
[45] Date of Patent: May 19, 1998

[54] DEVICE FOR AND METHOD OF MODIFYING THE SPECTRAL CHARACTERISTICS OF OPTICAL SIGNALS

[75] Inventors: Massimo Artiglia, Turin; Ernesto Ciaramella, Rome, both of Italy

[73] Assignee: Cselt—Centro Studi e Laboratori Telecomunicazioni S.P.A., Turin, Italy

[21] Appl. No.: 690,068

[22] Filed: Jul. 31, 1996

[30] Foreign Application Priority Data

Oct. 2, 1995 [IT] Italy .................. TO95 A 000782

[51] Int. Cl.$^6$ .................................................. G02F 1/39
[52] U.S. Cl. ........................ 359/332; 359/326; 359/341; 372/6; 385/5; 385/15
[58] Field of Search .............................. 359/326–332, 359/341; 385/5, 15, 24, 27, 39; 372/6, 21, 22

[56] References Cited

U.S. PATENT DOCUMENTS

| | | | |
|---|---|---|---|
| 5,386,314 | 1/1995 | Jopson | 359/326 |
| 5,400,164 | 3/1995 | Kurtzke et al. | 359/326 X |
| 5,532,868 | 7/1996 | Gnauck et al. | 359/332 |
| 5,550,671 | 8/1996 | Simpson et al. | 359/326 X |
| 5,604,618 | 2/1997 | Mori et al. | 359/326 X |

OTHER PUBLICATIONS

"Using Modulation Instability to Determine Kerr Corfficient in Optical Fibres", M.Artiglia et al, Electronics letters 8th Jun. 1995, vol.31, No. 12, 2 pages.

"Compensation of Chromatic Dispersion in a Single–Mode Fiber by Optical Phase Conjugation", Shigeki Watanabe et al, IEEE Photonics Technology letters, vol.5, No. 1, Jan. 1993, 4 pages.

"Compensation for Channel Dispersion by Nonlinear Optical Phase Conjugation", Amnon Yariv et al, Optics letters, vol. 4, No. 2, Feb. 1979, 3 pages.

*Primary Examiner*—John D. Lee
*Attorney, Agent, or Firm*—Herbert Dubno

[57] ABSTRACT

The modification is accomplished on the basis of the solution known as spectral inversion (or optical phase conjugation). The device (1) comprises a medium, such as typically a dispersion shifted optical fiber (4), into which the signal to be modified is injected together with a pump signal at such a level as to induce modulation instability in the fiber (4). At the output of fiber (4) a spectrally inverted optical signal is available, which signal is translated in wavelength and is obtained with high conversion efficiency. Preferably, in order to avoid stimulated Brillouin scattering, the pump signal is subjected to spectrum broadening, for instance by means of a modulator (5).

33 Claims, 2 Drawing Sheets

DEVICE FOR AND METHOD OF MODIFYING THE SPECTRAL CHARACTERISTICS OF OPTICAL SIGNALS

FIELD OF THE INVENTION

The present invention relates to optical communication systems and, particularly, to a device for and a method of modifying the spectral characteristics of optical signals. Preferably, but not exclusively, the invention is applied to compensate the chromatic dispersion of optical signals transmitted over transmission carriers such as optical fibers. The term "chromatic dispersion" is used here to indicate both the characteristic of the transmission medium, and the effect on the transmitted signals.

BACKGROUND OF THE INVENTION

Optical fiber communication systems commonly employ silica optical fibers as their transmission carriers. Such fibers have minimum (substantially zero) dispersion at wavelengths in the so called "second transmission window" (wavelengths around 1.3 µm).

To compensate the attenuation of optical signals due to propagation along the fiber, increasing use is being made of optical amplifiers arranged to operate directly on the optical signal, thus avoiding the need to perform optical/electrical and electrical/optical conversions in the repeaters. Such optical amplifiers usually comprise a section of optical fiber doped with rare earth metals, in particular erbium. Those amplifiers generally operate at their top amplification efficiency in the third transmission window (wavelengths around 1.55 µm) and not in the second transmission window mentioned above. At those wavelengths, conventional silica fibers have minimum attenuation, but their chromatic dispersion is high, of the order of 15–20 ps/nm.km; this results in a large broadening of the pulses, which clearly is an obstacle to high bit-rate (>2.5 Gbit/s), long distance transmission.

Dispersion shifted optical fibers are commercially available, which have minimum dispersion in correspondence with the third window. However, those fibers can only be used for new installations, as it is not realistic (for obvious cost reasons) to replace optical fibers already laid and currently in operation.

Thus, the problem remains of compensating the dispersion undergone by optical signals transmitted at wavelengths in the third window as an effect of propagation along conventional fibers.

That problem has already been dealt with in different ways in the art, and a review of those ways is provided in "Unleashing the Full Capacity of the Installed Fiber Base", by D. N. Payne, R. I. Laming, D. J. Richardson and A. Grudinin, presented at ECOC 93, Montreux (Switzerland), 12–16 Sep., 1993, paper WeC8.1, Vol. 1, pp. 92–94.

Amongst the different techniques proposed to compensate chromatic dispersion, the so-called mid-span spectral inversion is a particularly elegant solution. According to that technique, the signal having propagated along the first half of a connection link is converted into a signal with such spectral characteristics that, when propagating through the second half of the connection link, it recovers the effect of the dispersion it had undergone in the first half. That technique of modifying the spectral characteristics of the optical signal, which is also known as Optical Phase Conjugation, is described for instance in the paper "Compensation for channel dispersion by nonlinear optical phase conjugation" by A. Yariv, D. Fekete and D. M. Pepper, Optics Letters, Vol. 4, pp. 52–54.

Taking that technique as a basis, the paper "Compensation of Chromatic Dispersion in a Single-Mode Fiber by Optical Phase Conjugation" by S. Watanabe, T. Naito and T. Chikama, IEEE Photonics Technology Letters, Vol. 5, No. 1, January 1993, pp. 92–95, describes a solution in which the optical signal to be subjected to chromatic dispersion compensation goes through a fiber amplifier (typically doped with $Er^{3+}$), then it is coupled with an optical pump signal—emitted for instance by a distributed feedback (DFB) laser operating at a wavelength of 1549 nm—and is finally injected into a 23 km long dispersion shifted fiber. The entire process gives rise, through the non linear optical phenomenon known as four wave mixing (or FWM), to a phase conjugated wave which, after going through a band pass optical filter centered around the wavelength of 1552 nm, is amplified again by a fiber amplifier before continuing propagating in the link.

A major drawback of the solution described in the paper by Watanabe et al. is its low conversion efficiency, typically around −20 dB for shifts of the order of 2–3 nm between the wavelength of the pump source and the signal being converted.

OBJECT OF THE INVENTION

An object of the present invention therefore is to overcome, among others, this major drawback.

SUMMARY OF THE INVENTION

In that regard it should be also kept in mind that, as stated above, although the exemplary embodiment of the invention described in detail hereinafter specifically deals with the problem of compensating chromatic dispersion, the scope of the invention is very general, since the invention can be used to perform other processes of modifying the spectral characteristics of an optical signal, for example frequency translations and similar operations.

The solution according to the invention is based on modulation instability, which is a non linear phenomenon occurring in optical fibers operating in anomalous dispersion conditions for high optical power values (typically above 10 dBm).

In particular, experiments have been carried out which that, by exploiting modulation instability, thus by operating in the anomalous dispersion region of the fiber, a much wider conversion band is obtained and efficiency is much higher (typically in the −5 dB to +5 dB range, so that it is even possible to have a conversion gain).

Modulation instability has already been used in the art, for instance to determine the Kerr non linearity coefficient in a single mode optical fiber, as described in the paper "Using modulation instability to determine Kerr coefficient in optical fibers", by M. Artiglia, E. Ciaramella and B. Sordo, Electronics Letters, 8 Jun., 1995, Vol. 31, No. 12, pp. 1012–1013.

BRIEF DESCRIPTION OF THE DRAWING

The above and other objects, features, and advantages will become more readily apparent from the following description, reference being made to the accompanying drawing in which.

SPECIFIC DESCRIPTION

Theoretical Basis of the Invention

Figure 1:
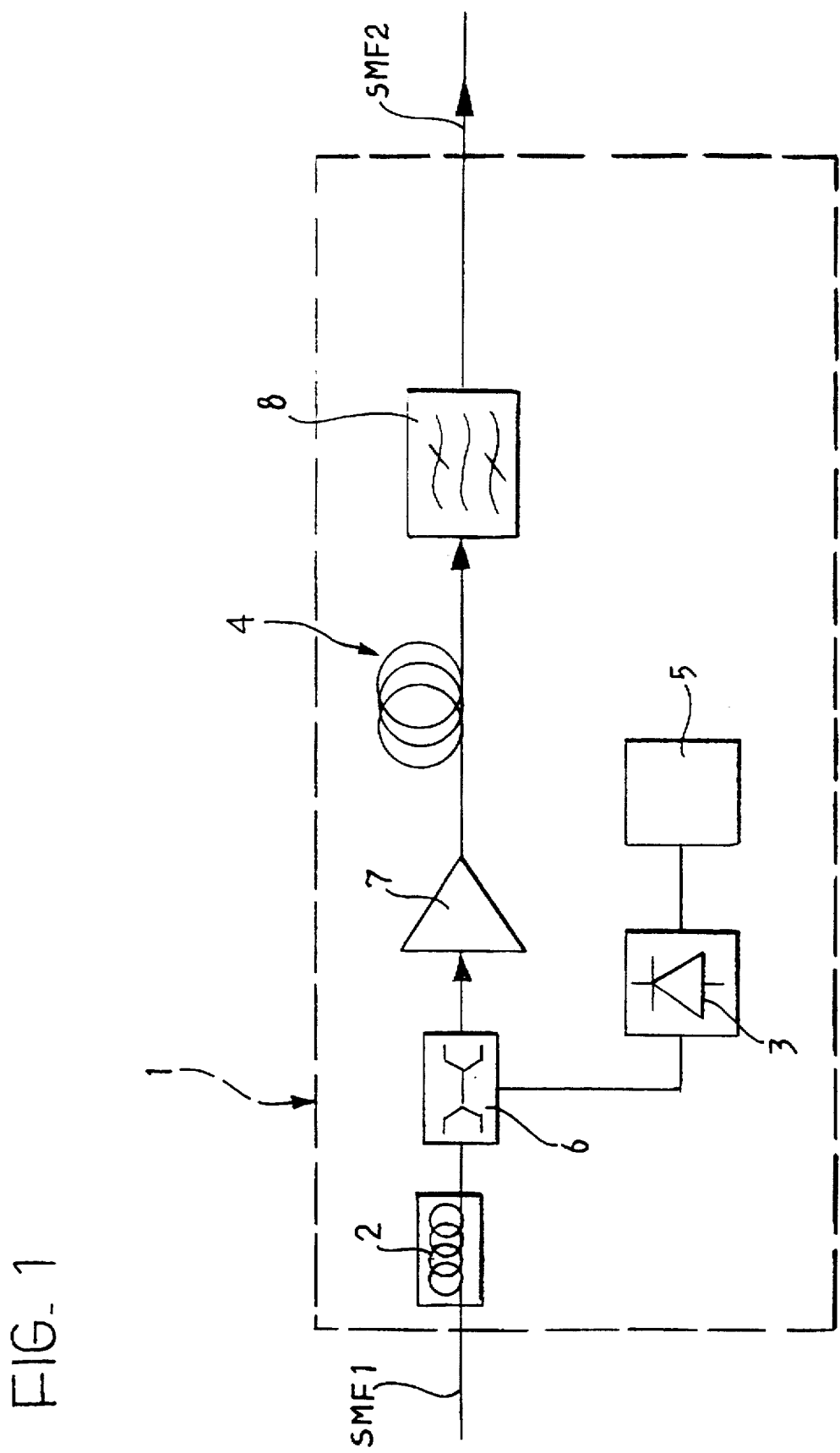
FIG. 1 is a block diagram of a device to correct the chromatic dispersion of optical signals, according to the invention.

For sake of clarity of terminology and understanding, it is appropriate briefly to recall here some basic concepts which will be mentioned several times in the course of the description that follows.

In most materials usable for the propagation of optical signals (the term "optical" is here used in its broadest sense, without limiting it to the range of visible radiation), at high enough powers, the so-called optical Kerr effect becomes relevant. Due to that effect, the refractive index of the medium depends on optical intensity I of the radiation propagating in the medium itself according to relation:

$$n(I) = n_o + n_2 \cdot I$$

where $n(I)$ represents the value of the refractive index as a function of intensity I (and therefore of the power) of the radiation propagating in the medium, $n_o$ is the linear refractive index (constant), and $n_2$ is the so-called non linear coefficient of the refractive index (also called simply non linear refractive index).

One of the results of the Kerr optical effect is the so-called "modulation instability", a phenomenon that arises when a high power optical signal ("pump" signal) propagates in a dispersive medium, in particular an optical fiber, in anomalous dispersion conditions, i.e. when the wavelength $\lambda_p$ of the pump signal exceeds the zero dispersion wavelength $\lambda_o$ of the fiber. As an effect of that phenomenon, a continuous optical signal becomes unstable (hence the name of the effect) and generates, in the optical spectrum, two gain bands, symmetrically located with respect to its frequency.

The shapes and positions of those bands depend on the power of the pump signal and on the chromatic dispersion coefficient of the medium. In particular, it can be assumed that the maximum gain coefficient of those bands is proportional to the pump power and that the widths of the bands increase as the pump power increases and as the chromatic dispersion coefficient decreases.

Essentially, the solution according to the invention is based on the fact that, if another optical signal (information signal) injected into the medium in addition to the pump signal, in correspondence with one of those gain bands, a double phenomenon occurs. The information signal is amplified by the modulation instability of the pump and at the same time the mirror (i.e. spectrally inverted) image of the pump is created, thus obtaining, in addition to a frequency (wavelength) translation, the sought spectral inversion phenomenon, also known as optical phase conjugation.

To attain the desired effect, in general it is important to have high pump powers available (typically of the order of 10 dBm or more). Secondly, since the conjugated signal must be easily separable from both the signal undergoing conversion and the pump signal, wavelength spacing between the signals must be such as to allow such separation of the useful conjugated signal. That operation is performed by means of optical filters (which in common practice have bandwidths of about 1 nm). As a result, it is important for the spectral band on which the non linear phenomenon can produce an efficient conversion to be wide enough. That condition can be achieved by operating in an optical fiber with sufficiently low values of chromatic dispersion coefficient $\beta_2$, for instance below 0.1 ps/(nm·km). This can be attained, for example in a dispersion shifted fiber (DSF), when the pump wavelength $\lambda_p$ is higher than and as close as possible (for example, with a spacing of about 1 nm) to the zero dispersion wavelength $\lambda_o$ of the fiber.

It is important to stress that, in the exemplary embodiment under consideration, the pump wavelength must in any case lie in the anomalous dispersion region of the dispersion shifted fiber. Under that condition, it is possible fully to exploit the contribution due to the non linear phase displacement which causes a broadening of the useful conversion bandwidth.

In any case, the solution according to the invention can be carried out in any medium giving rise to a modulation instability phenomenon. Therefore, the specific reference made hereafter, by way of example, to the use of a dispersion shifted fiber should not be interpreted as an absolute and limiting characteristic of the solution according to the invention.

FIG. 1 depicts a block diagram of device 1 according to the invention. The device according to the invention is meant to be placed (ideally at midspan) in an optical fiber communication link, between two sections indicated respectively as SMF1 and SMF2, to accomplish optical phase conjugation on a signal that propagates on the fiber.

At the input of device 1 according to the invention, an optical signal with wavelength $\lambda_s$ (information signal) present on section SMF1 is made to go through a polarization control device 2, of a known type, which allows the same polarization state to be attained both in the information signal entering the device and in a pump signal generated by an optical radiation source 3. Without being an essential requirement, the presence of the same polarization state in the information and pump signals may maximize optical phase conjugation efficiency. On the other hand, it is evident that the polarization control could be carried out on the pump signal from source 3. Preferably, source 3 is a laser diode, for instance a DFB laser, operating at an emission wavelength $\lambda_p$ chosen in the vicinity (typically at a distance of the order of 1nm) of the zero dispersion wavelength $\lambda_o$ of an optical medium 4 in which the phase conjugation is accomplished. For the exemplary embodiment illustrated here, $\lambda_p$ must exceed $\lambda_o$.

According to the choice considered preferable at this time, medium 4 comprises a section, for example about 10–20 kilometers long, of a dispersion shifted fiber, having for instance $\lambda_o$=1551 nm and an attenuation of the order of 0.25 dB/km. Wavelengths $\lambda_s$ of the information signal and $\lambda_p$ of the pump signal were, in the example described herein, 1550 nm and 1552 nm, respectively.

Reference 5 indicates a modulating device connected to pump source 3 for purposes which will be better explained further on.

Through an optical coupler 6, the signal coming from polarization control device 2 is combined with the pump signal coming from source 3 and is then injected into fiber 4 after being amplified in an optical amplification stage 7. In a possible embodiment of the invention, stage 7 comprises two optical amplifiers using active fibers and generating an optical signal whose level is of the order of 15 dBm. That level is high enough to give rise to modulation instability and to a good conversion efficiency.

In any case, individual amplifiers providing output powers exceeding 20 dBm are already available today. The embodiment of stage 7 using two cascaded elements is therefore given purely by way of non limiting example. At any rate, an additional improvement in the performance of the device can be expected as the output power of amplification stage 7 increases.

Lastly, an optical filtering stage 8 is provided with the of eliminating from the signal exiting fiber 4, the spectral components corresponding to the remains of the pump signal and of the input signal, letting through only the conjugated signal (in the present example, at a wavelength of about 1554 nm). In this case, too, stage 8 can comprise a single filter, as shown schematically in FIG. 1, or multiple cascaded filters. However, it should be noted that the aforesaid filtering action need not be performed in conjugating device 1. It can be carried out at the output of link section SMF2, immediately before the receiver in which the received optical signal is detected. Therefore the device may lack stage 8.

Injecting powers like those under consideration (of the order of 10–20 dBm or more) into an optical fiber usually requires particular measures. If the emission line of pump source 3 is narrow (for example, less than 20 MHz), fiber 4 will exhibit another non linear phenomenon (known as stimulated Brillouin scattering) which, above a certain power threshold (about 6 dBm, thus at lower levels than the injection levels considered when carrying out the invention), causes a non linear attenuation of the pump signal. In that situation, increasing the pump power would not lead to a significant increase in spectral inversion efficiency.

Therefore, to raise the stimulated Brillouin scattering threshold, it is necessary to intervene on the pump signal generated by source 3 so as to broaden the emission line in a controlled manner. This can be accomplished either by slightly modulating the drive current of source 3 with modulator 5, as shown in the Figure, or through direct phase modulation of the optical signal emitted by the source itself, by means of an electro-optical modulator, also of a known type.

The spectral broadening of the pump signal in itself could entail a loss of fidelity in the reproduction of the inverted spectrum. Therefore it is important to reach a proper compromise between the need to raise the stimulated Brillouin scattering threshold and the need to maintain fidelity in the reproduction of the spectrum obtained through optical phase conjugation. With the solution illustrated (drive current modulation), for example, broadening the emission line of source 3 to values in the order of 0.5–1 GHz was found to be a good compromise.

Figure 2:
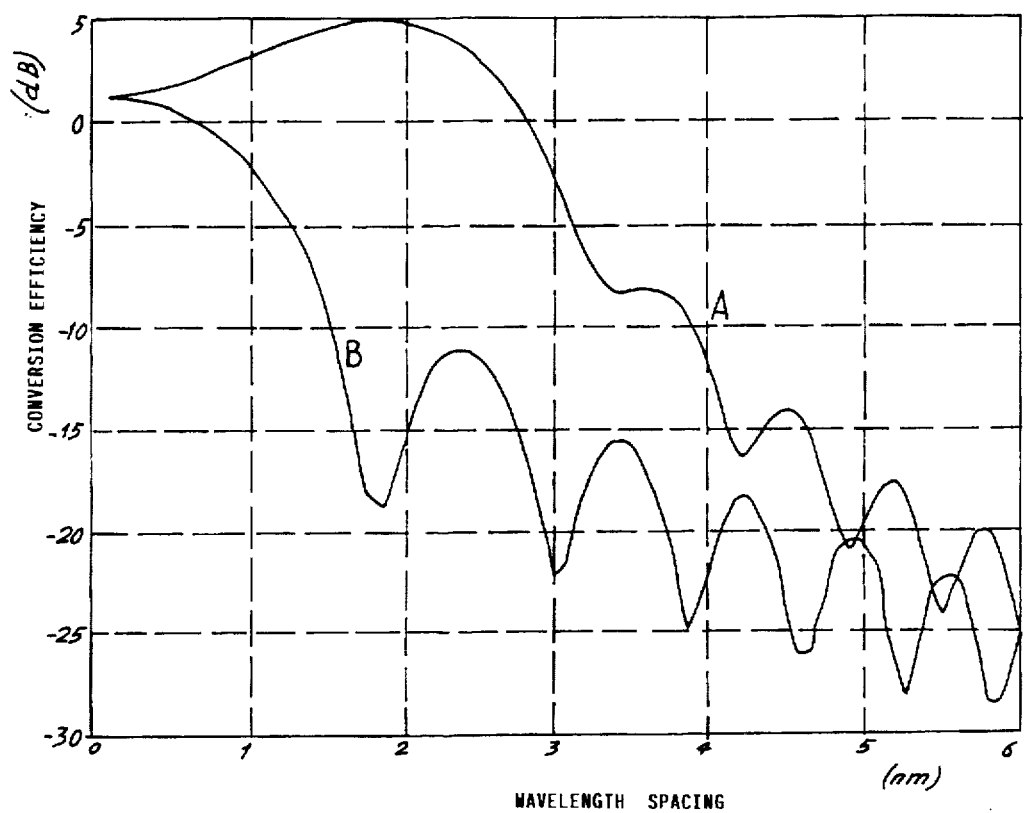
FIG. 2 is a comparative graph showing the conversion efficiency of a device according to the invention and of a prior art device.

The diagram in FIG. 2 represents the conversion efficiency (in dB) versus the spacing between wavelengths $\lambda_s$, $\lambda_p$ of the information signal and of the pump signal in the case of the invention (curve A) and of the solution known from the article by Watanabe et at (curve B). Conversion efficiency is defined as ratio Pc(L)/Ps(O), where Pc(L) and Ps(O) are respectively the levels of the conjugated optical signal at the output of fiber 4 and of the optical signal at the input of the same fiber (thus, with reference to the diagram in FIG. 1, after amplification in amplification stage 7).

Figure 3:
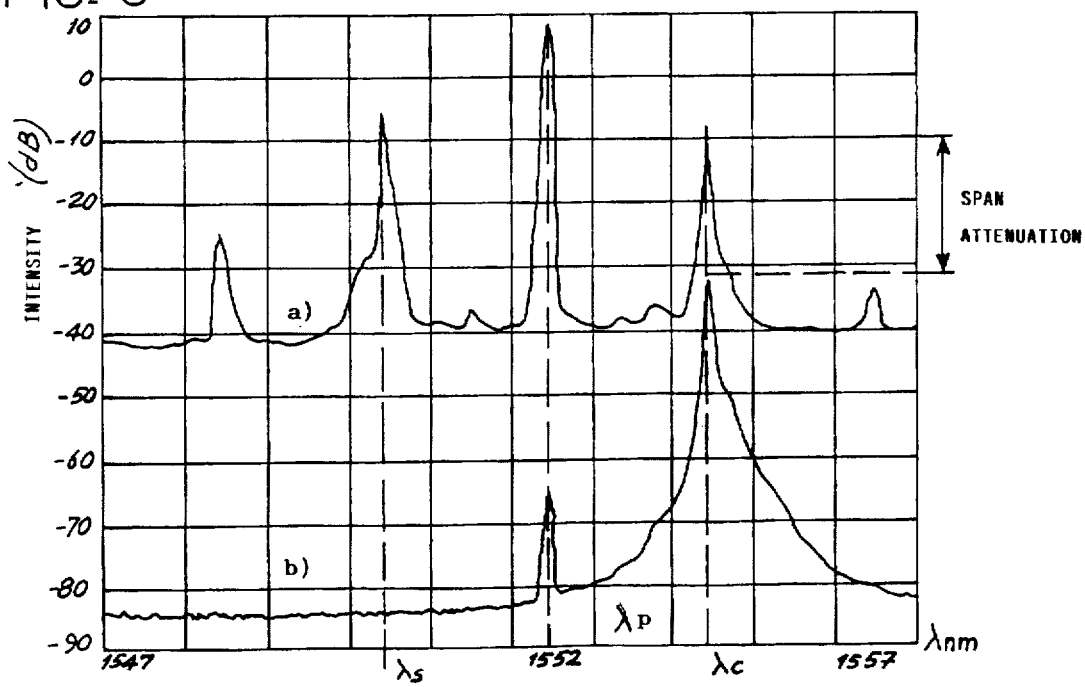
FIG. 3, comprising two superimposed parts, indicated respectively as a and b, is another graph depicting the performance of a device according to the invention.

FIG. 3 shows two optical spectra, measured at high resolution (0.1 nm), of the radiation observed at the output of fiber 4 immediately before filtering stage 8 (curve a) and after filtering stage 8 (curve b). Curve (a) clearly shows the pump signal ($\lambda_p$), the information signal whose spectral characteristics are being modified ($\lambda_s$) and the conjugated signal ($\lambda_c$), in addition to some negligible intermodulation products, also due to non linear interaction. The mirror imaging of the spectrum of the signal in its conjugated signal is evident. The conversion process of the invention, as can clearly be seen, yields much lower losses than the known method (about 2 dB versus about 20 dB). Curve (b), on the other hand, refers to the conjugated signal as it is transmitted in the second half of the link (in the case shown, section SMF2 had a length of 100 km with an attenuation of about 0.22 dB/km). Therefore, the signal of curve (b), compared to the previous one, suffers from both the effect of the filtering carried out by filter 8 and the attenuation of link section SMF2. Hence, the peak of the conjugated signal in curve (b) is attenuated by about 22 dB with respect to the corresponding peak in curve (a).

Of course, given the principles of the invention, the implementing details and the practical embodiments may vary widely with respect to what has been described and illustrated, without departing from the scope of the present invention.

This applies first of all to the choice of the medium in which the interaction between the signal to be compensated and the pump signal is carried out by exploiting the modulation instability based on the Kerr optical effect. As stated above, that medium need not be a dispersion shifted fiber, although at the moment this is considered the preferred choice. For instance, medium 4 might be a fiber with amplification properties (for example an active fiber or a fiber in which Raman effect amplification is accomplished), with suitable dispersion properties ($\lambda_o$ slightly lower than $\lambda_p$): in this case the medium could also perform the functions of amplification stage 7.

Similarly, if a pump signal of a high enough level is available at the output of device 3 (possibly with an enclosed modulator, like modulator 5), the pump signal needs not pass through amplification stage 7. The same principle of course applies also for the information signal at the input of device 1, if the level thereof is high enough, for instance because the signal has been amplified just before entering device 1. In such conditions, amplifying stage 7 can be dispensed with. It should be stressed that, regardless of the way in which the desired powers are obtained at the input of medium 4, thanks to the high conversion efficiency obtainable through modulation instability, the invention allows eliminating the output amplifier present in the known device, with the technical and economic advantages deriving from a reduction in the number of components.

As stated previously, the use of the solution according to the invention is not limited to chromatic dispersion compensation. The invention can also be used, for instance, to perform a frequency translation of signals that are not excessively broadened by chromatic dispersion. This can be useful for example to build wavelength converters, by locating the input signal in correspondence with a first wavelength and locating the outgoing conjugated signal in correspondence with a second wavelength so as to accomplish a wavelength translation (or a frequency translation, which, as is well known, is wholly equivalent). The translation entity depends (see FIG. 3) on the spacing between the first wavelength and the wavelength of the optical pump signal, and is essentially equal to twice that spacing.

Wavelength converters can find many applications in the field of optical telecommunications, both in the transport network and in the access network. For example, they can be used in wavelength division multi-channel systems, in which several optical carriers are multiplexed on the same fiber, for signal routing or for wavelength reallocation aimed at avoiding routing conflicts. System flexibility is thus enhanced, and it is possible to increase link capacity, the number of reachable users, or the type of services provided.

A further application could be as optical amplifier. In effect, if the pump power is sufficiently high, the modulation instability can provide amplification of the input signal besides spectral inversion. In such conditions, filtering stage 8 must suppress at least the pump signal. The conjugated signal may be suppressed or not.

We claim:

1. A device for modifying the spectral characteristics of an optical signal by means of spectral inversion or optical phase conjugation comprising:

an optical medium operating in anomalous dispersion conditions, in which spectral inversion is accomplished;

means for feeding an optical signal to be modified to the device;

an optical source generating an optical pump signal at a first wavelength; and means for injecting said optical signal to be modified into said optical medium together with said pump signal, at a given level in order to carry out said spectral inversion in said optical medium, said optical source and said feeding and injecting means being arranged to inject said signals at a level which is sufficiently high as to produce modulation instability in said optical medium whereby the optical spectrum of said pump signal exhibits two gain bands, symmetrically located with respect to its wavelength, and to inject said optical signal to be modified with a wavelength lying within one of the modulation instability gain bands, so that the wavelength of the spectrally inverted signal lies within a gain band that is symmetrical with respect to the pump signal.

2. The device as claimed in claim 1, wherein said injecting means comprises, between said optical source and said optical medium, an amplification stage amplifying the optical pump signal generated by said source before injection into said optical medium.

3. The device as claimed in claim 2, wherein said amplification stage also receives said optical signal to be modified.

4. The device as claimed in claim 3, wherein said optical medium comprises an amplifying optical fiber which also carries out the functions of said amplifying stage.

5. The device as claimed in claim 4, in which said dispersion shifted optical fiber and/or said amplifying fiber have a zero dispersion wavelength ($\lambda_o$), the wavelengths ($\lambda_p$, $\lambda_s$) of said optical pump signal and of said optical signal to be modified being in the vicinity of said zero dispersion wavelength ($\lambda_o$).

6. The device as claimed in claim 5, wherein said wavelength ($\lambda_p$) of said optical pump signal is spaced by about 1 nm from and is higher than said zero dispersion wavelength ($\lambda_o$).

7. The device as claimed in claim 6 which further wherein comprises, downstream of said optical medium filtering means (8) to suppress the remains of said optical pump signal and of said optical signal to be modified, thus letting only the optical signal deriving from said spectral inversion pass through.

8. The device as claimed in claim 7, wherein said optical signal to be modified is an optical signal affected by chromatic dispersion exiting a first span of an optical communication line and said signal resulting from spectral inversion is present at the input of a second span of said optical communication line, with such characteristics of chromatic dispersion and such a length as to compensate, in the spectrally inverted signal, the effect of the dispersion introduced by the first span on the optical signal to be modified.

9. The device as claimed in claim 7, wherein said optical source injects the optical pump signal at such a level that the modulation instability also gives rise to an amplification of the optical signal to be modified, and in that the device switch comprises, downstream of said optical medium, filtering means to suppress the optical pump signal.

10. The device as claimed in claim 5, wherein the wavelength ($\lambda_s$) of said optical signal to be modified is lower than the wavelength ($\lambda_p$) of said optical pump signal.

11. The device as claimed in claim 10, wherein said optical signal to be modified is a signal essentially unaffected by chromatic dispersion and is located around a first wavelength, and said spectrally inverted signal is located around a second wavelength, spaced apart from the first wavelength, said optical medium accomplishing a wavelength translation whose entity is determined by a spacing of said first wavelength with respect to the wavelength ($\lambda_p$) of said pump signal.

12. The device as claimed in claim 2, wherein said optical source has spectrum broadening means broadening the spectrum of said optical pump signal enough to prevent stimulated Brillouin scattering in said optical medium.

13. The device as claimed in claim 12, wherein said spectrum broadening means comprises a modulator which modulates a drive current of said optical source.

14. The device as claimed in claim 12, wherein said spectrum broadening means comprises a modulator which modulates the signal generated by said optical source.

15. The device as claimed in claim 2 which also comprises polarization control means for imparting a same polarization state to said optical signal to be modified and said optical pump signal before injection into said optical medium.

16. The device as claimed in claim 15, wherein said polarization control means act on said optical signal to be modified.

17. The device as claimed in claim 2, wherein said optical medium comprises a dispersion shifted fiber.

18. A method of modifying the spectral characteristics of an optical signal through spectral inversion or optical phase conjugation comprising the following operations:

providing an optical medium operating in anomalous dispersion conditions in which said spectral inversion is accomplished, and injecting into said optical medium, together with said optical signal to be modified, an optical pump signal at a given level, in order to accomplish spectral inversion in said optical medium, said method also comprising the steps of:

choosing said given level high enough to produce modulation instability in said optical medium, and choosing the wavelength of said optical signal to be modified within one of the modulation instability gain bands, the spectrally inverted signal having a wavelength within the gain band that is symmetrical with respect to said optical pump signal.

19. The method as claimed in claim 18, which comprises the step of amplifying said optical pump signal before injection thereof into said optical medium.

20. The method as claimed in claim 19, wherein said optical signal to be modified is also amplified prior to injection into said optical medium.

21. The method as claimed in claim 19, wherein both said optical pump signal and said optical signal to be modified are amplified in said optical medium.

22. The method as claimed in claim 19, further comprising the step of broadening the spectrum of said optical pump signal enough to prevent stimulated Brillouin scattering in said optical medium.

23. The method as claimed in claim 22 which comprises the step of generating said optical pump signal by means of a current driven optical source, said spectrum broadening being accomplished by modulating the drive current of said optical source.

24. The method as claimed in claim 23 which further comprises the step of controlling the polarization state of at least one among said optical signal to be modified and said optical pump signal, to ensure that, at the injection into said optical medium, said optical signal to be modified and said optical pump signal have the same polarization state.

25. The method as claimed in claim 24, which comprises the step of controlling the polarization state of said optical signal to be modified.

26. The method as claimed in claim 23 in which said optical medium has a zero dispersion wavelength ($\lambda_o$), the wavelengths of said optical pump signal and of said optical signal to be modified being chosen to lie in the vicinity of said zero dispersion wavelength ($\lambda_o$).

27. The method as claimed in claim 26, wherein said wavelength ($\lambda_p$) of said optical pump signal is spaced by about 1 nm from and is higher than said zero dispersion wavelength ($\lambda_o$).

28. The method as claimed in claim 27, wherein the wavelength ($\lambda_s$) of the optical signal to be modified is lower than the wavelength of said optical pump signal ($\lambda_p$).

29. The method as claimed in claim 27, which comprises the step of filtering, downstream of said optical medium, the signal resulting from the optical phase conjugation performed in said optical medium, so as to eliminate from said conjugated signal the remains of said optical pump signal and of said optical signal to be modified, letting the conjugated optical signal pass through.

30. The method as claimed in claim 29, wherein the optical signal to be modified is an optical signal which has propagated along a first span of optical fiber and which is affected by chromatic dispersion, and in that said spectrally inverted signal is injected into a second span of optical fiber with such characteristics of chromatic dispersion and such a length that, in said spectrally inverted signal, the compensation of said dispersion introduced in the first span on the optical signal to be modified is accomplished.

31. The method as claimed in claim 29, wherein said optical signal to be modified is a signal which essentially is unaffected by chromatic dispersion and is located around a first wavelength, and said spectrally inverted optical signal is located around a second wavelength, spaced from the first one, the spacing between said first and second wavelengths constituting a translation of the wavelength of the optical signal to be modified whose entity is determined by the spacing between said first wavelength and the wavelength ($\lambda_p$) of said optical pump signal.

32. The method as claimed in claim 27, wherein said given level is sufficiently high that the modulation instability also gives rise to amplification of the optical signal to be modified, the method further comprising the step of filtering, downstream of said optical medium, the signal resulting from the optical phase conjugation performed in said optical medium, so as to eliminate from said conjugated signal the optical pump signal.

33. The method as claimed in claim 22, which comprises the step of modulating said optical pump signal to broaden its spectrum.

* * * * *